US005160156A

United States Patent [19]

Mendon

[11] Patent Number: 5,160,156

[45] Date of Patent: Nov. 3, 1992

[54] WHEELCHAIR WITH COASTING, BRAKING AND MULTI-SPEED FEATURES

[75] Inventor: Stephen P. Mendon, McFarland, Wis.

[73] Assignee: Concentric Industries, Clinton, Wis.

[21] Appl. No.: 581,863

[22] Filed: Sep. 13, 1990

[51] Int. Cl.[5] .............................................. B62M 1/14

[52] U.S. Cl. ................................ 280/250.1; 280/236; 280/238

[58] Field of Search ..................... 280/236, 238, 250.1, 280/304.1, 260, 253; 297/DIG. 4; 475/297

[56] References Cited

U.S. PATENT DOCUMENTS 4,595,212 6/1986 Haury et al. .................... 280/250.1

FOREIGN PATENT DOCUMENTS 3526985 6/1986 Fed. Rep. of Germany ... 280/250.1

*Primary Examiner*—David M. Mitchell
*Assistant Examiner*—Annemarie Boehler
*Attorney, Agent, or Firm*—Andrus, Sceales, Starke & Sawall

[57] ABSTRACT

A wheelchair is provided with a multiple speed hub, each including a self-contained shifting mechanism for selectively changing gears. The hubs include both coasting and braking features and are controlled by drive rings mounted concentric with the wheelchair rear wheels. The mechanism permits hands-on shifting, coasting and braking actions.

13 Claims, 2 Drawing Sheets

WHEELCHAIR WITH COASTING, BRAKING AND MULTI-SPEED FEATURES

REFERENCE TO RELATED APPLICATION

This application is the subject of a Disclosure Document, dated Jan. 8, 1990, having received Disclosure Document Number 242832.

BACKGROUND OF THE INVENTION

1. Field of the Invention

This invention relates generally to wheelchairs and more particularly to wheelchairs including a multiple speed, shiftable hub with a drive ring for selectively changing the gear ratio between the wheel and the drive ring.

2. Description of the Prior Art

Standard manual wheelchairs typically include large back wheels, sometimes fitted with a hand rim, wherein the user grasps the wheel or rim and applies a forward force to cause forward rotational movement of the wheels. This results in a constant 1:1 drive ratio which can cause difficulty for the user when encountering an incline or other difficult terrain. In addition, users in a reduced strength condition often have difficulty in using any wheelchair utilizing a 1:1 drive ratio. In many such cases, the only recourse is to use a powered wheelchair.

Over the years, several attempts have been made to develop a manual wheelchair where the ratio between the drive force and the wheels may be varied. Examples of such devices are illustrated in the Sasse U.S. Pat. No. 3,563,568; Zach U.S. Pat. No. 4,272,965; and the Seol U.S. Pat. No. 4,762,332.

In Sasse, the drive mechanism includes a pair of concentric driving and driven members with intervening gear trains therebetween. A shift lever is provided for operating the gear train. The drive member is a wheel disposed outwardly of and concentric with the standard wheel on the wheelchair. Sasse does not provide for any coasting or braking action and the user must remove one of his hands from the wheel in order to shift gears. This makes shifting while in motion difficult, particularly since each side of the wheelchair is controlled by a separate shift lever.

Seol provides a propulsion device incorporating a flywheel which is used with a lever, whereby the user grasps the lever on either side of the wheelchair and, in a rowing-like motion, transmits a force to the flywheel. The flywheel force is then transferred to the wheels to propel the chair forward. The user must remove his hands from the flywheel levers in order to change gears. Further, this device makes impractical any standard use of the chair where a direct rotational force is applied to the wheels.

Zach provides for a geared hub having at least one forward speed and an active hub brake. In Zach, the user is required to pull a shift chain on each side of the wheelchair to effect a gear change. Again, the user must remove both hands from the wheels to change gears.

None of the prior art wheelchairs provides for a drive ring which engages the standard wheel when moved in a forward direction, while providing for hands-on gear shifting, coasting, and/or braking action. The present invention overcomes these and other disadvantages while providing a safe and simple to use configuration.

SUMMARY OF THE INVENTION

It is an object of the invention to provide a wheelchair with standard manual wheels and a pair of second wheels or drive rings, wherein the drive rings translate a driving motion to the standard manual wheels when rotated in a forward direction and free wheel or coast when held relatively stationary or when no force is applied.

It is an additional object of the invention to provide a wheelchair with multiple drive ratios between the drive rings and the standard wheels, wherein shifting from one drive ratio to another can be accomplished without removing hands from the drive rings.

It is further an object of the invention to provide a wheelchair with drive rings for driving standard wheels, wherein a braking force can be applied to the standard wheels by applying a steady reverse direction force on the drive rings.

It is a further object of the invention to provide a manual wheelchair including drive rings for driving standard wheels, where the normal use of the standard wheels is not impaired by the drive rings and hub assemblies.

It is also an object of the invention to provide a hub assembly mounting arrangement wherein each hub and shaft can be mounted on the wheelchair frame with all working components of the hub assembly outboard of the frame.

The present invention includes a standard, manually driven wheelchair of the type having a pair of large wheels typically adapted to be grasped by the hands of the user, whereby a motive force is applied directly to the wheels in the direction of desired travel. The wheels rotate independently of one another to facilitate turning. In the disclosed invention, each wheel is attached to the hub which is mounted for rotation on an axle shaft secured to the frame of the wheelchair. A second wheel or drive ring is mounted on the shaft for rotation independently of the hub. Intermediate of the hub and the drive ring is a gear train assembly for translating the motion of the drive ring to the hub. The gear ratio may be any desired ratio, depending upon application. In the preferred embodiment, the gear train includes a plurality of gear sets and a back pedaling bicycle-type multiple speed hub is used to shift between gear sets to change the drive ratio between the drive rings and the hubs. The gear ratio is changed by applying a short reverse motion to the drive rings, followed by a forward motion.

The hub assembly of the present invention also provides for a coasting action, whereby the drive rings are in a free wheeling relationship with the hubs and may be held relatively stationary while the wheelchair moves in a forward direction, permitting the wheelchair to coast while still grasping the drive rings.

In addition, the preferred hub assembly includes a braking action, whereby a braking force may be applied to the hubs by applying a steady reverse force on the drive rings.

The wheelchair includes a pair of brackets on the frame for supporting the axle shaft of each hub assembly intermediate its opposite ends and a spaced clamp bracket associated with each hub for receiving and securing one end of the shaft to the frame. The opposite end of the shaft receives the hub and drive ring assembly. This arrangement provides even stress distribution on the shaft and greatly simplifies the mechanism by permitting all of the working parts to be outboard of the wheelchair frame.

Additional advantages and features of the invention will be readily apparent from the drawing and description of the preferred embodiment which follow.

DETAILED DESCRIPTION OF THE PREFERRED EMBODIMENT

The wheelchair of the present invention includes a pair of standard manual wheels, each with a hub and a concentric drive ring mounted for rotation relative to the hub for controlling action of the hub and standard wheel. In the preferred form, the hub and drive wheel incorporate a multiple speed hub such as that shown, by way of example, in the Schwerdhofer U.S. Pat. Nos. 3,134,274 and 3,438,283; and the Segawa et al U.S. Pat. No. 4,147,243. Another example of a suitable hub is the Bendix® Red Band model or Yellow Band model two-speed coaster brake hub manufactured by the Bendix Company in the 1950s and 1960s. All of these hubs use a back pedaling shifting technique for changing the drive ratio between a bicycle chain drive and rear wheel hub.

Figure 1:
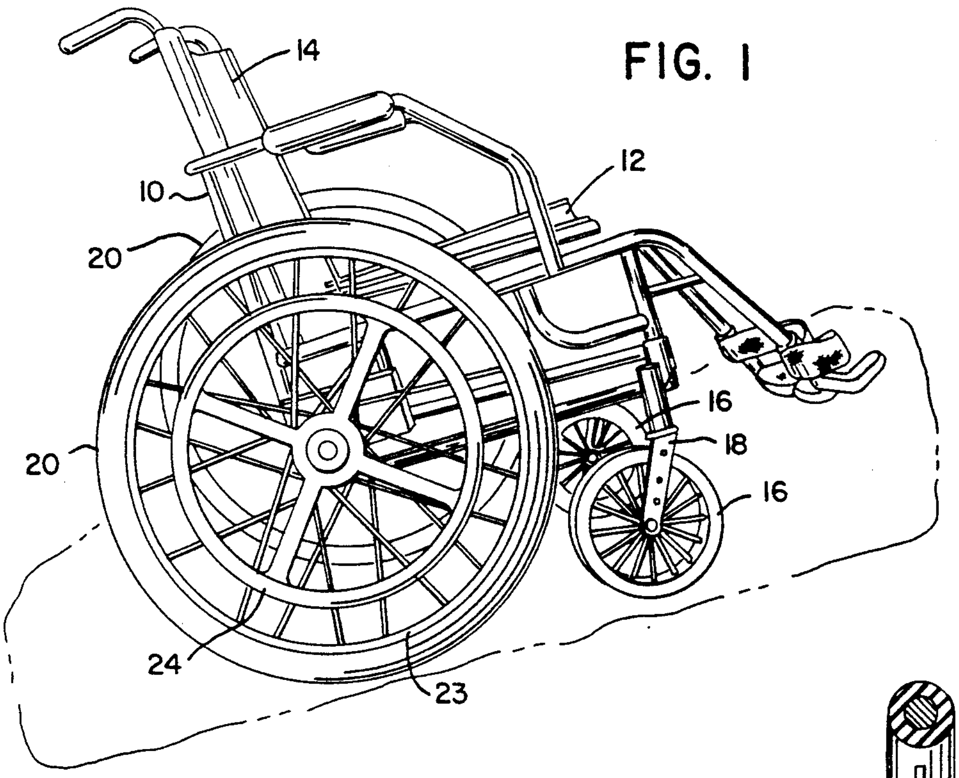
FIG. 1 is a side elevational view of a wheelchair including the features of the present invention.
Figure 3:
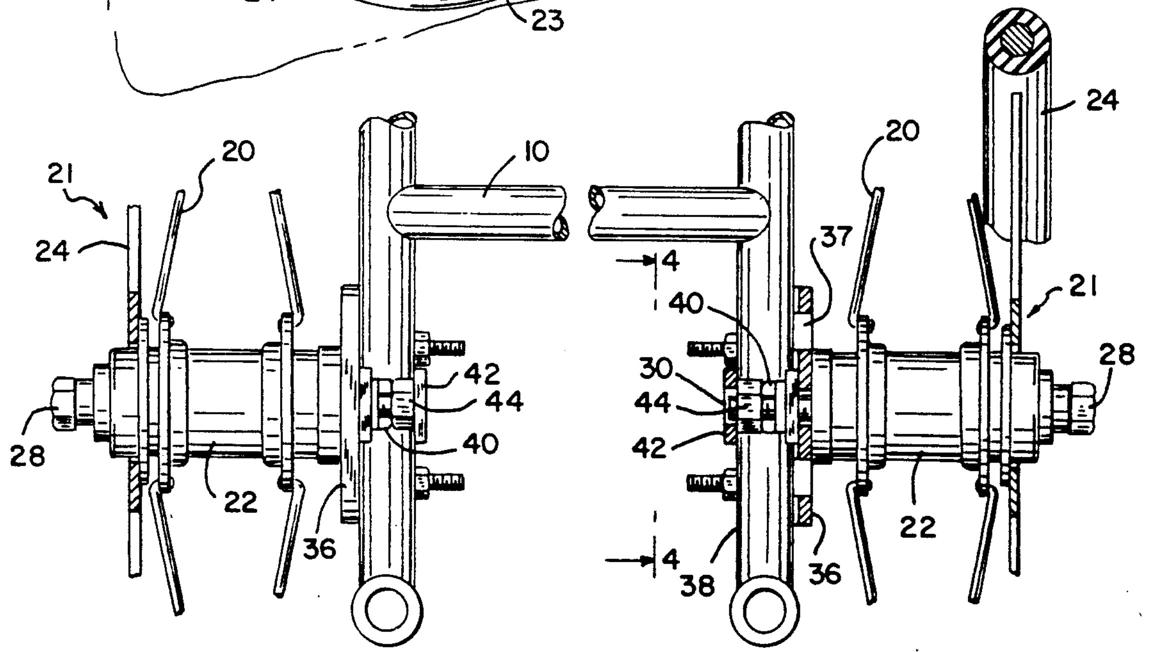
FIG. 3 is an enlarged, fragmentary rear view of the wheelchair of FIG. 1.
Figure 4:
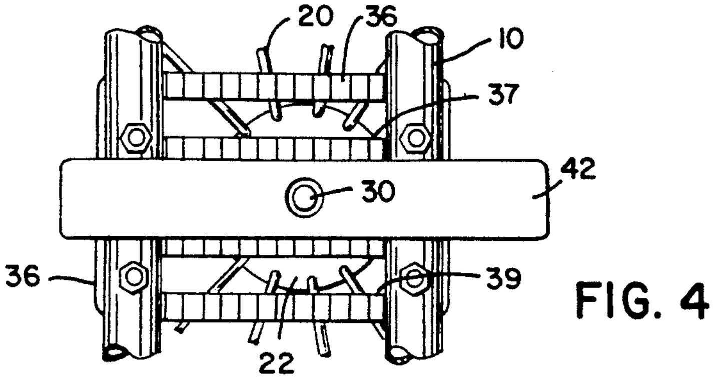
FIG. 4 is a view taken in the direction of arrow 4 of FIG. 3.

As shown in FIG. 1, the wheelchair of the preferred embodiment includes a tubular frame 10 for supporting a seat 12 and a back 14. A pair of small front ground-engaging wheels 16 are rotatably mounted on brackets 18 which are typically mounted on vertical spindles 19 rotatably carried in frame 10 to facilitate turning. The wheelchair includes a pair of large back ground-engaging wheels 20, each mounted on a hub assembly 21 which includes an outer hub 22 (FIG. 3). The wheels 20 may each include a fixed hand rim 23 (FIG. 2), as desired. A second wheel or drive ring 24 is concentric with each wheel 20 and is mounted for rotation relative to the wheel 20 and associated hub 22.

Figure 2:
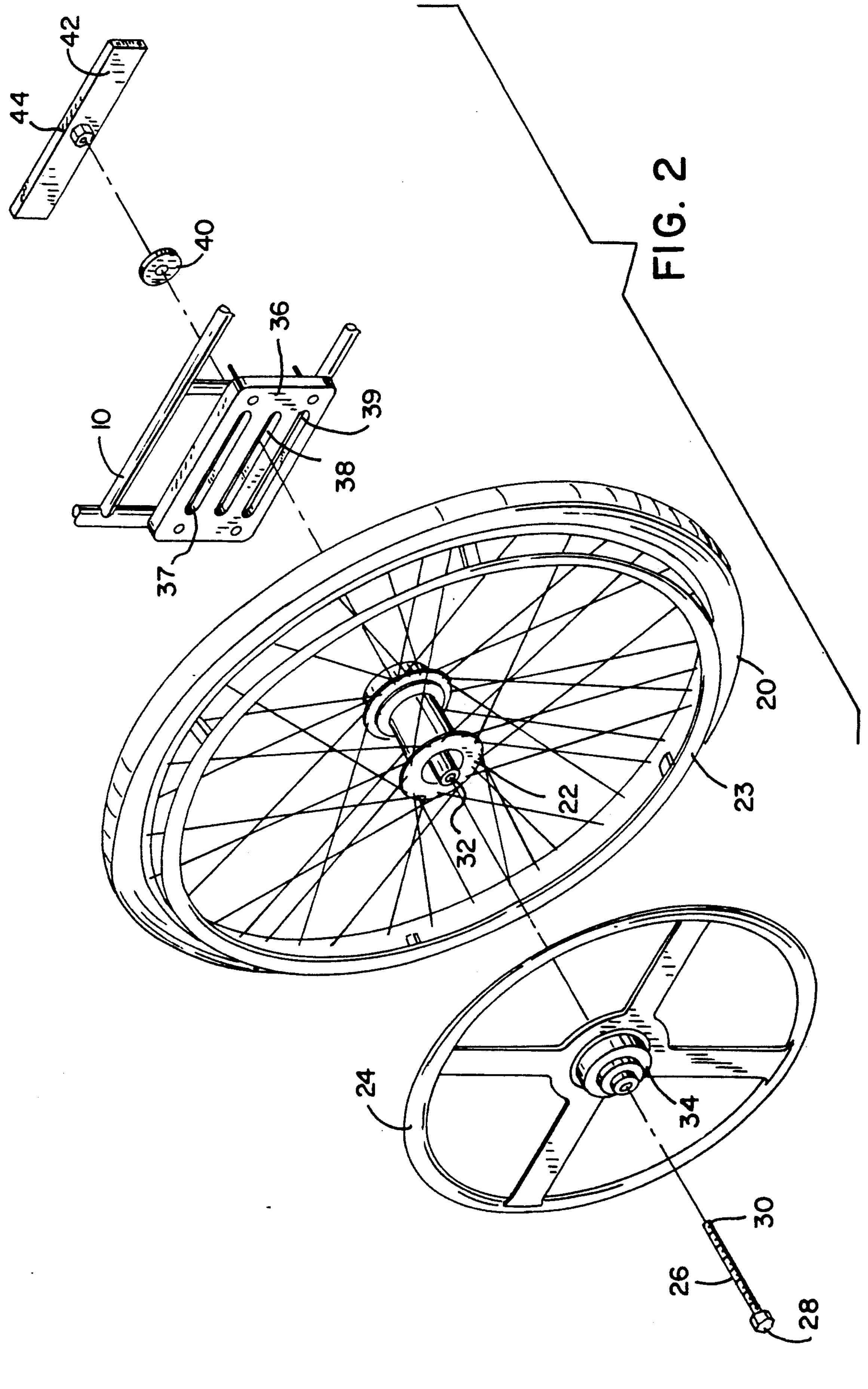
FIG. 2 is an enlarged exploded view of the hub assembly of the wheelchair of FIG. 1.

As best shown in FIGS. 2 and 3, the hub assembly 21 includes an axle shaft 26 with an enlarged head 28 and, in the preferred embodiment, a threaded opposite end 30. The outer hub 22 includes a concentric inner hub 32. Control means such as a gear train assembly (not shown) is intermediate of the inner hub and the outer hub and translates the motion of the inner hub 32 to the outer hub 22 in a predetermined drive ratio provided by the gear train. In the preferred embodiment, a Bendix® Yellow Band model coaster brake hub assembly is used. The hub is shown and described in the *Handbook for Bicycle Mechanics*, Sutherland, Howard, et al, 1985, 4th Ed., Sutherland Publications, incorporated by reference herein. It will be understood by those skilled in the art that the particular type of gear hub used is a matter of choice. Any number of available hub gear assemblies such as, by way of example, hubs similar to those disclosed in the *Handbook for Bicycle Mechanics*, or in U.S. Pat. Nos. 3,134,274; 3,438,283 and 4,147,293.

The Bendix-type hub assembly includes an outer hub 22 and a concentric inner hub 32. Intermediate of the hubs is a gear train (not shown) comprising two gear sets for providing a high ratio and low ratio drive in typical manner. The inner hub is attached to a drive mechanism such as a chain sprocket drive in bicycle applications or the drive ring 24, as shown. The Bendix-type hub also includes a standard, coaster brake mechanism known to the art, which operates as shown and described in the aforementioned *Handbook for Bicycle Mechanics*.

In its preferred form, the inner hub 32 and outer hub 22 are in driving engagement when a forward rotational force is applied to the inner hub. When the inner hub is held relatively stationary or when no force is applied to it, the inner hub is free wheeling i.e., it coasts relative to the outer hub. When a predetermined reverse motion is applied to the inner hub, followed by a forward motion, the engaged gear sets are shifted from one to the other. When a constant reverse force is applied to the inner hub, a braking force and action and force is applied to the outer hub for braking the standard wheel 20.

The drive ring 24 is mounted on a fixed drive ring hub 34, which is securely mounted on the inner hub 32. Whenever the drive ring 24 is rotated, this force is directly translated to the inner hub 32.

The combined hub and wheel assembly comprising wheel 20, outer hub 22, inner hub 32, drive ring 24 and fixed hub 34 are all mounted for free rotation on the axle shaft 26. Shaft 26 is received by a suitable slot 38 in the bracket 36 which is securely mounted on the frame 10. As shown, bracket 36 may include a plurality of generally horizontal slots 37, 38, 39, whereby the relative height of the frame and hub assembly may be adjusted to provide for user comfort. Also, the elongate slots 37, 38, 39 provide for generally horizontal front-to-back adjustment of the wheel and hub assembly.

The shaft 26 passes through the selected slot 38 and a spacer 40 and is received by the bracket clamp 42. In the preferred embodiment, the bracket clamp 42 is provided with a tapped aperture such as the secured nut 44, and the threaded axle shaft 26 is turned into the aperture to tightly secure the hub assembly to the frame. The spacer provides a tight, secure fit between the bracket 36 and nut 44, and when tightened, the clamp bracket 42 is secured against the frame 10, as shown. In this manner, both an intermediate portion of the shaft 26 and an end portion of the shaft is supported, permitting all of the working components of the hub assembly to be outboard of the frame 10 without creating undue stress upon the bracket 36 and axle shaft 26.

In operation, using the preferred Bendix® two-speed hub assembly described, the user can apply a rotational force directly to the wheel 20 or the hand rim 21 for operating the wheelchair in typical manner. In addition, the user can take advantage of the low and high speed gear ratios provided by the two-speed hub by applying a forward rotational force directly to the drive ring 24, which transfers the force to the inner hub 32 for driving outer hub 22 in accordance with the selected gear set of the engaged gear train.

When a drive ratio change is desired, the user applies a short reverse stroke to the drive ring 24, followed by a forward drive stroke, effecting a gear change. This operates in the same manner as a shifting of gears by backpedaling a bicycle equipped with the same Bendix-type hub. Typically, a 15°-20° reverse stroke is sufficient to effect a gear change. The gear change may be made on the fly or while stationary, providing a slight forward stroke follows the reverse stroke.

Where the drive ring 24 is not engaged, or is held relatively stationary, the ring is free wheeling. This permits the wheelchair to coast without requiring the user to let go of the drive rings. This provides better control and safer operation, permitting the user to maintain his grasp on the drive rings during both shifting and coasting actions.

The Bendix-type two-speed hub provides an additional important braking feature, whereby the user can applying a braking force to the outer hubs 22 and wheels 20 by applying a steady reverse motion force on drive rings 24 and thereby on inner hubs 32. Thus, by using the device of the present invention, the user is always in contact with the drive rings during forward, coasting and braking actions.

The standard wheels 20 and hand rims 23 may be used in typical fashion when a 1:1 drive ratio is desired in both the forward and reverse direction. The drive rings 24 are employed for engaging a drive ratio other than 1:1 in the forward direction and for coasting and braking actions.

It is, of course, within the scope of the present invention to provide a gear mechanism other than that specifically described herein. Such mechanism may include features which differ from the Bendix-type system disclosed. One such feature is the incorporation of a multiple-speed gear set including more than two settings.

Also, the coasting feature of the invention is an important aspect which stands apart from the multiple-speed capabilities. A fixed drive hub with a coaster brake, as described in the aforementioned *Handbook for Bicycle Mechanics*, will provide the coasting and braking features of the invention without the requirement of a multi-speed gear train.

It will further be understood that the hub and drive ring assembly of the invention can be readily adapted to be retrofitted to existing wheelchairs, and may be offered in an accessory kit form for that purpose. In such applications, the hub assemblies 21, drive rims 24, brackets 36, spacers 40 and clamps 42 would be provided in kit form for retrofitting existing wheelchairs.

The drive rings 24 may be any desired diameter to increase or decrease the effective ratio between the wheels 20 and the drive rings. In certain applications, changeable drive rings may be provided, where drive rings of different diameter may be used as the user's strength and needs change.

Thus, the present invention provides a versatile wheelchair having coasting and braking features with single or multiple-speed gearing and a plurality of drive ratios available by either selectively changing the gears of drive hubs and/or altering the diameter of the drive rings. This permits a wheelchair to be designed for any of a variety of applications depending on the needs and strength of the user. The present invention provides an improved, safe and simple to use wheelchair that provides for continuous hands-on control during shifting, coasting and braking actions.

While certain features and embodiments of the invention have been described herein, it will be understood that the invention includes all enhancements and modifications within the scope of the attached claims.

What is claimed is:

1. In a wheelchair designed to be manually operated by a wheelchair user, the wheelchair having a frame for supporting a pair of first ground-engaging wheels and a pair of second ground-engaging drive wheels, each of the second wheels being mounted for forward and reverse rotation on a coaster hub, the improvement comprising:

a. a pair of drive rings, one each mounted concentric with one of said coaster hubs and in driving relationship therewith when rotated in a forward direction; and b. control means associated with each of said second wheels and said coaster hubs, wherein the control means and coaster hub of one of said second wheels operate independently of the control means and coaster hub of the other said second wheel, the control means providing a coasting action permitting said second wheels to rotate independently of said drive rings when not physically driven by said drive rings in a forward direction, wherein each control means further includes means intermediate the drive ring and the coaster hub for translating the forward rotational movement of the drive ring to the coaster hub, the means including a plurality of gear sets intermediate each of said coaster hubs and the drive ring for independently selectively altering the drive ratio between the associated said second wheel and drive ring without requiring the user to remove his hands from the drive rings.

2. The wheelchair of claim 1, wherein said control means each further include a brake associated with said drive ring and said coaster hub for providing a braking action on the associated second wheel when a reverse direction force is applied to said drive ring.

3. The wheelchair of claim 1, wherein each of said coaster hubs further comprises:

a. a mounting shaft for rotatably supporting the associated coaster hub; and b. a first bracket on the frame for receiving such shaft, wherein each of the second wheels is mounted on the associated coaster hub for direct rotation therewith; and wherein the associated drive ring is mounted on said shaft for rotation independently of said coaster hub.

4. The wheelchair of claim 3, wherein each coaster hub further includes a second bracket spaced from said first bracket and adapted for securing said shaft to said frame.

5. The wheelchair of claim 4, wherein said first bracket includes an elongate slot for receiving said shaft, said slot extending generally horizontally and providing for horizontal adjustment of said coaster hub relative to said frame.

6. The wheelchair of claim 5, wherein said first bracket further includes a plurality of generally vertically spaced horizontal slots, each slot being adapted for receiving said shaft for providing vertical adjustment of said coaster hub relative to said frame.

7. The wheelchair of claim 1, wherein said control means each further comprises a multiple-speed coaster hub with a self-contained speed change mechanism, said multiple-speed coaster hub including:

a. an axle shaft secured to said frame;

b. an outer coaster hub mounted for rotation about said shaft, the second wheel being mounted on said outer coaster hub for direct rotation therewith, wherein said drive ring is mounted on said shaft for rotation independently of said coaster hub; and c. shift means for selectively engaging one of said gear sets.

8. The wheelchair of claim 7, wherein said shift means further includes means for shifting between gear sets when a reverse rotation is applied to said drive ring followed by a forward rotation applied to said drive ring.

9. The wheelchair of claim 7, wherein said multiple-speed coaster hub further includes means for applying a braking force on said coaster hub when a constant reverse rotational force is applied to said drive ring.

10. The wheelchair of claim 7, wherein said multiple-speed coaster hub further includes means for allowing free rotation of said coaster hub relative to said drive ring when no rotational force is applied to the drive ring.

11. A kit for modifying a wheelchair designed to be manually operated by a wheelchair user, the wheelchair having a frame for supporting a pair of first ground-engaging wheels and a pair of second ground-engaging drive wheels, the kit comprising:

a. a pair of coaster hubs, each said coaster hub for rotatably supporting a second wheel for both forward and reverse rotation;

b. a pair of drive rings, one each mounted concentric with one of said coaster hubs and in driving relationship therewith when rotated in a forward direction;

c. control means associated with each of said second wheels and said coaster hubs, wherein the control means and coaster hub of one of said second wheels operate independently of the control means and coaster hub of the other said second wheel, the control means providing a coasting action permitting said second wheels to rotate independently of said drive rings when not physically driven by said drive rings in a forward direction, wherein each control means further includes a plurality of gear sets intermediate the associated coaster hub and the drive ring for selectively altering the drive ratio between said second wheels and said drive rings, without requiring the user to remove his hands from the drive rings;

d. a pair of mounting shafts one each for rotatably supporting one of said coaster hubs;

e. a pair of first brackets adapted to be mounted on the frame, each for receiving the associated shaft, wherein each of the second wheels is mounted on the associated coaster hub for direct rotation therewith, and the associated drive ring is mounted on said shaft for rotation independently of said coaster hub; and f. a pair of second brackets each adapted to be spaced from the associated first bracket and adapted for securing the associated shaft to said frame.

12. The kit of claim 11, wherein each said control means further includes a brake associated with the associated drive ring and coaster hub for providing a braking action on said second wheels when a reverse direction force is applied to said drive rings.

13. A wheelchair designed to be manually operated by a wheelchair user, the wheelchair having a frame for supporting a pair of first round-engaging wheels and a pair of second, ground-engaging drive wheels, each of the drive wheels being mounted for forward and reverse rotation on a coaster hub, the improvement comprising:

a. a pair of drive rings, one each mounted concentric with one of said coaster hubs and in driving relationship therewith when rotated in a forward direction;

b. a coasting mechanism associated with each of said coaster hubs for permitting a coasting action whereby said second wheels freely rotate when not physically driven by said drive rings in a forward direction;

c. a brake associated with each of said drive rings and said coaster hubs for providing a braking action on said second wheels when a reverse direction force is applied to each of said drive rings; and d. control means associated with each of said second wheels and said coaster hubs, wherein the control means and coaster hub of one of said second wheels operate independently of the control means and coaster hub of the other said second wheel, the control means providing a coasting action permitting said second wheels to rotate independently of said drive rings when not physically driven by said drive rings in a forward direction, wherein each control means further includes a plurality of gear sets intermediate the associated coaster hub and said drive ring for selectively altering the drive ratio between said second wheels and said drive rings, without requiring the user to remove his hands from the drive rings.

* * * * *